(12) United States Patent
Filardo

(10) Patent No.: US 9,145,875 B2
(45) Date of Patent: Sep. 29, 2015

(54) RIBBON TRANSDUCER AND PUMP APPARATUSES, METHODS AND SYSTEMS

(71) Applicant: Benjamin Pietro Filardo, New York, NY (US)

(72) Inventor: Benjamin Pietro Filardo, New York, NY (US)

(73) Assignee: Pliant Energy Systems LLC, Brooklyn, NY (US)

( * ) Notice: Subject to any disclaimer, the term of this patent is extended or adjusted under 35 U.S.C. 154(b) by 0 days.

(21) Appl. No.: 14/024,581

(22) Filed: Sep. 11, 2013

(65) Prior Publication Data

US 2014/0015378 A1 Jan. 16, 2014

Related U.S. Application Data

(63) Continuation-in-part of application No. 13/347,601, filed on Jan. 10, 2012, now Pat. No. 8,610,304, and a continuation-in-part of application No. 12/617,618, filed on Nov. 12, 2009, now Pat. No. 8,432,057, and a (Continued)

(51) Int. Cl.
*F03B 13/00* (2006.01)
*F04B 9/08* (2006.01)

(Continued)

(52) U.S. Cl.
CPC . *F04B 9/08* (2013.01); *F03B 17/06* (2013.01); *H02N 2/18* (2013.01); *H02N 2/185* (2013.01); *F05B 2220/709* (2013.01); *F05B 2240/311* (2013.01); *Y02E 10/28* (2013.01)

(58) Field of Classification Search
CPC ............ H02N 2/18; H02N 2/185; F04B 9/08; F03B 17/06; Y02E 10/28; F05B 2220/709; F05B 2240/311

USPC .......... 290/42, 43, 53, 54; 417/394; 310/330, 310/367

See application file for complete search history.

(56) References Cited

U.S. PATENT DOCUMENTS

3,467,013 A 9/1969 Conner
3,961,863 A 6/1976 Hooper, III
(Continued)

FOREIGN PATENT DOCUMENTS

CN 1474912 A 2/2004
CN 101021199 A 8/2007
(Continued)

OTHER PUBLICATIONS

Extended European Search Report with European search opinion for European Application No. 09847665.8, dated Jun. 20, 2012 (6 pages).

(Continued)

*Primary Examiner* — Pedro J Cuevas
*Assistant Examiner* — Viet Nguyen
(74) *Attorney, Agent, or Firm* — Irell & Manella LLP

(57) ABSTRACT

The RIBBON TRANSDUCER AND PUMP APPARATUSES, METHODS AND SYSTEMS include, in various embodiments, a variety of mechanisms comprised of components that include flexible elements with persistently strained deformations. Under operation, the deformations may be reconfigured via actuation to produce useful work, or may be reconfigured when subjected to external forces, such as from flowing fluid. The external energy input used to reconfigure these deformations may be harnessed and converted into electrical energy or may be converted into useful mechanical work, such as pumping.

15 Claims, 16 Drawing Sheets

Related U.S. Application Data continuation-in-part of application No. 12/242,144, filed on Sep. 30, 2008, now Pat. No. 7,696,634, and a continuation-in-part of application No. 12/150,910, filed on May 1, 2008, now abandoned.

(60) Provisional application No. 61/700,181, filed on Sep. 12, 2012, provisional application No. 60/926,984, filed on May 1, 2007.

(51) Int. Cl.
  *H02N 2/18* (2006.01)
  *F03B 17/06* (2006.01)

(56) References Cited

U.S. PATENT DOCUMENTS

| | | | |
|---|---|---|---|
| 4,145,882 A | 3/1979 | Thorsheim | |
| 4,164,383 A | 8/1979 | French | |
| 4,310,264 A | 1/1982 | Brownlee | |
| 4,469,596 A | 9/1984 | Kantor | |
| 4,488,854 A | 12/1984 | Miller | |
| 4,498,850 A | 2/1985 | Perlov et al. | |
| 5,192,197 A | 3/1993 | Culp | |
| 6,069,420 A | 5/2000 | Mizzi et al. | |
| 6,153,944 A | 11/2000 | Clark | |
| 6,424,079 B1 | 7/2002 | Carroll | |
| 7,352,073 B2 | 4/2008 | Ames | |
| 7,470,086 B2 | 12/2008 | Jennings et al. | |
| 7,492,054 B2 | 2/2009 | Catlin | |
| 7,696,634 B2 * | 4/2010 | Filardo | 290/54 |
| 7,839,007 B2 * | 11/2010 | Filardo | 290/43 |
| 7,863,768 B2 * | 1/2011 | Filardo | 290/54 |
| 8,120,195 B2 * | 2/2012 | Pollack et al. | 290/53 |
| 8,426,999 B2 * | 4/2013 | Drevet | 290/54 |
| 8,432,057 B2 * | 4/2013 | Filardo | 290/54 |
| 2002/0146333 A1 | 10/2002 | Drevet | |
| 2006/0172629 A1 | 8/2006 | Gusler | |
| 2006/0192389 A1 | 8/2006 | Perry et al. | |
| 2008/0129254 A1 | 6/2008 | Frayne | |
| 2008/0229745 A1 | 9/2008 | Ghouse | |
| 2009/0058095 A1 | 3/2009 | McClintic | |
| 2009/0134623 A1 | 5/2009 | Krouse | |
| 2010/0066084 A1 * | 3/2010 | Ehrnberg | 290/42 |
| 2010/0084871 A1 | 4/2010 | Filardo | |
| 2010/0133848 A1 | 6/2010 | Piasecki | |
| 2012/0286625 A1 * | 11/2012 | Cherian | 310/319 |
| 2014/0023481 A1 * | 1/2014 | Drevet | 415/90 |
| 2014/0319969 A1 * | 10/2014 | Denes et al. | 310/339 |

FOREIGN PATENT DOCUMENTS

| | | |
|---|---|---|
| CN | 101069014 A | 11/2007 |
| EP | 0 322 899 A2 | 7/1989 |
| EP | 1 219 834 A1 | 7/2002 |
| WO | 2007/139408 A2 | 12/2007 |
| WO | 2008091208 A1 | 7/2008 |
| WO | WO 2008091208 A1 * | 7/2008 |
| WO | 2011/011026 A1 | 1/2011 |
| WO | 2011/055111 A2 | 5/2011 |

OTHER PUBLICATIONS

Extended European Search Report with European Search Opinion for European Application No. 09847664.1, dated Jul. 1, 2013 (6 pages).
International Search Report from the International Searching Authority for PCT/US13/59315, dated Jan. 29, 2014 (18 pages).
Extended European Search Report with European search opinion for European Application No. 13179345.7, dated Dec. 11, 2014 (8 pages).
Written Opinion from the International Searching Authority for PCT/US13/59315, issued Mar. 17, 2015 (8 pages).
First Office Action issued for Chinese Patent Application No. 200980161224.8 including Search Report, dated Mar. 19, 2014 (12 pages).
First Office Action issued for Chinese Patent Application No. 200980161230.3 including Search Report, dated Mar. 13, 2014 (6 pages).
Second Office Action issued for Chinese Patent Application No. 200980161230.3, dated Nov. 3, 2014 (4 pages).
International Search Report and Written Opinion issued for PCT/US2009/062257, dated Dec. 24, 2009 (7 pages).
International Search Report and Written Opinion issued for PCT/US2009/064241, dated Jan. 27, 2010 (7 pages).
International Search Report and Written Opinion issued for PCT/US2012/020836, dated May 8, 2012 (16 pages).

* cited by examiner

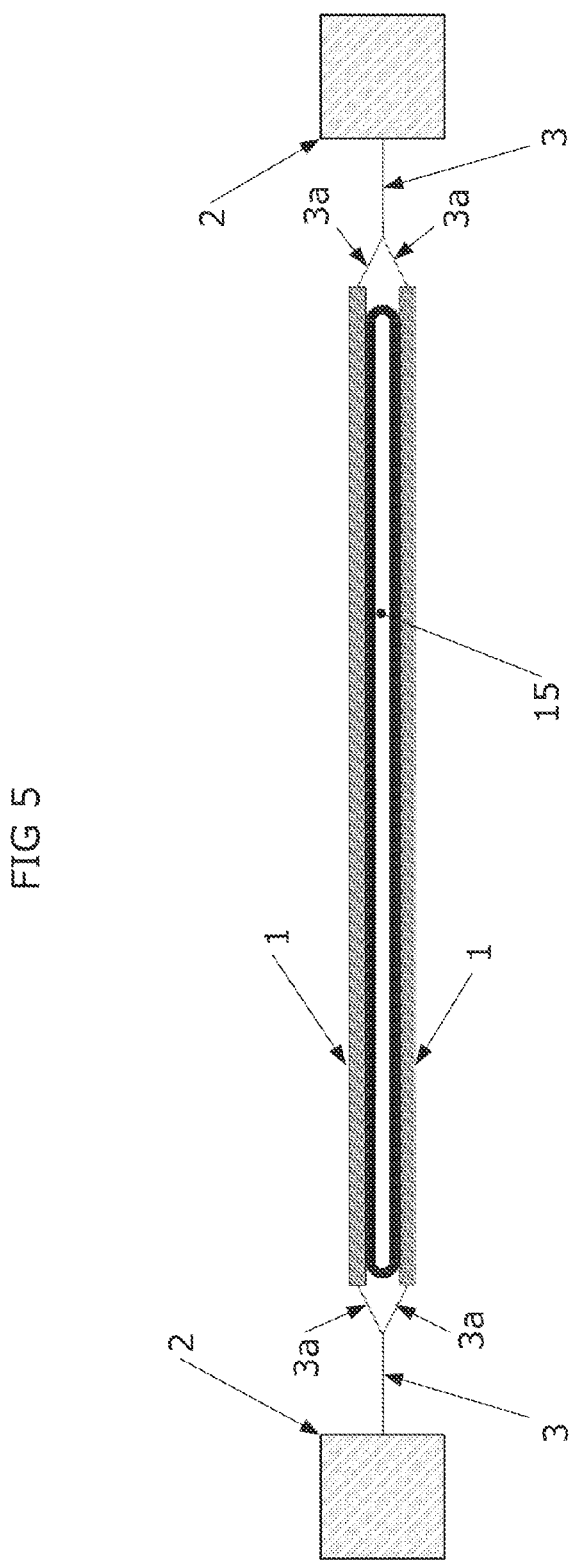

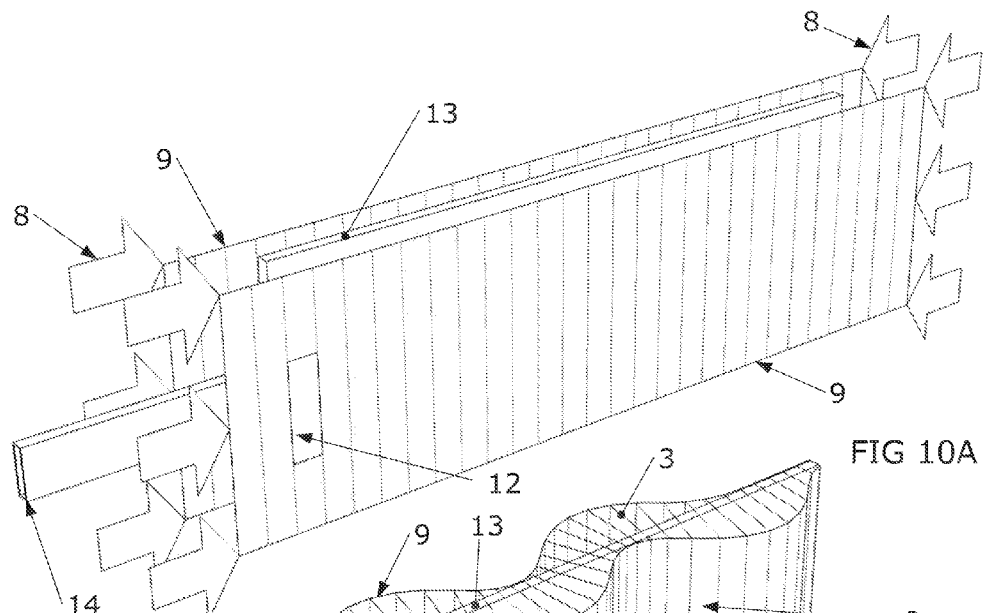
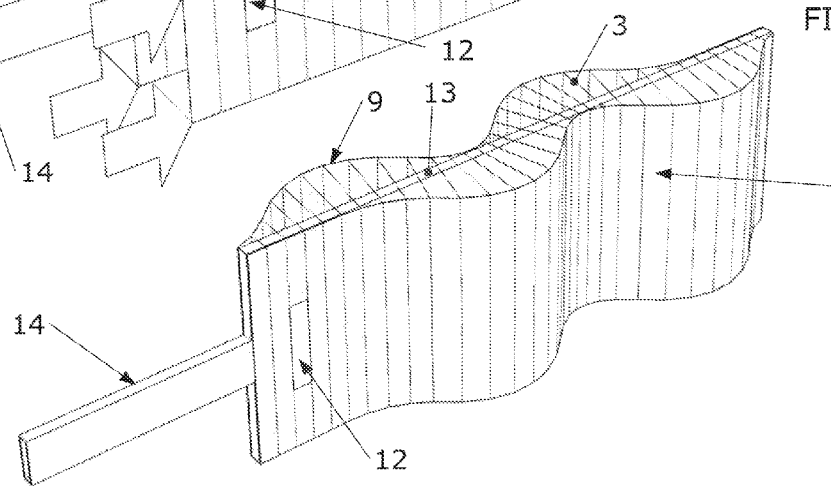
FIG 10A
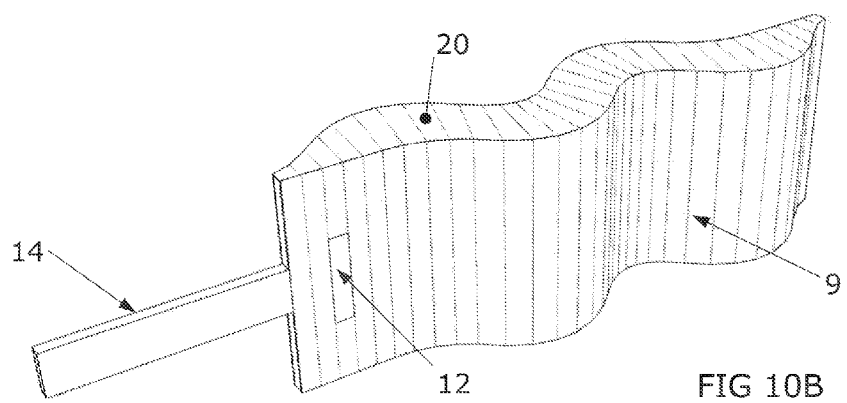
FIG 10B

RIBBON TRANSDUCER AND PUMP APPARATUSES, METHODS AND SYSTEMS

RELATED APPLICATIONS

This application is a Non-Provisional of and claims priority under 35 U.S.C. §119 to prior U.S. provisional patent application Ser. No. 61/700,181 entitled, "Ribbon Transducer and Pump Apparatuses, Methods and Systems," filed Sep. 12, 2012.

This application is also a Continuation-In-Part of and claims priority under 35 U.S.C. §120 to co-pending U.S. non-provisional patent application Ser. No. 13/347,601 entitled, "Mechanisms for Creating Undulating Motion, Such as for Propulsion, and for Harnessing the Energy of Moving Fluid," filed Jan. 10, 2012; which in turn claims priority under 35 U.S.C. §120 to prior non-provisional patent application Ser. No. 12/617,618 entitled, "Pliant or Compliant Elements for Harnessing the Forces of Moving Fluid to Transport Fluid or Generate Electricity," filed Nov. 12, 2009; which in turn claims priority under 35 U.S.C. §120 to prior non-provisional patent application Ser. No. 12/242,144 entitled, "Pliant Mechanisms for Extracting Power From Moving Fluid," filed Sep. 30, 2008; which in turn claims priority under 35 U.S.C. §120 to prior U.S. non-provisional patent application Ser. No. 12/150,910 entitled, "Power generator for extracting power from fluid motion," filed May 1, 2008; which in turn claims priority under 35 U.S.C. §119 to prior U.S. provisional patent application Ser. No. 60/926,984, filed May 1, 2007.

The entire contents of the aforementioned applications are herein expressly incorporated by reference.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights/

FIELD

The present innovations are directed to apparatuses, methods, and systems for energy generation and mechanical pumping, and more particularly, to RIBBON TRANSDUCER AND PUMP APPARATUSES, METHODS AND SYSTEMS (hereinafter, "RTP").

BACKGROUND

Many types of pumps exist, most of which are generally used to move or transport fluid. Typically, pumps receive energy to convert into mechanical work. Energy generation systems have also come about, which typically convert mechanical work into usable or stored forms of energy.

BRIEF DESCRIPTION OF THE DRAWINGS

The accompanying appendices and/or drawings illustrate various non-limiting, example, inventive aspects in accordance with the present disclosure:

FIG. 5 shows a sample pump embodiment of the RTP;

FIGS. 10A-10B show other example pump embodiments of the RTP;

DETAILED DESCRIPTION

Aspects of the innovations disclosed herein include mechanisms comprised of components that include flexible elements configured to support persistent strained deformations. Under operation, the deformations may be reconfigured via actuation to produce useful work, or may be reconfigured when subjected to external forces, such as from flowing fluid. The external energy input used to reconfigure these deformations may be harnessed and converted into electrical energy or may be converted into useful mechanical work, such as pumping.

Figure 1:
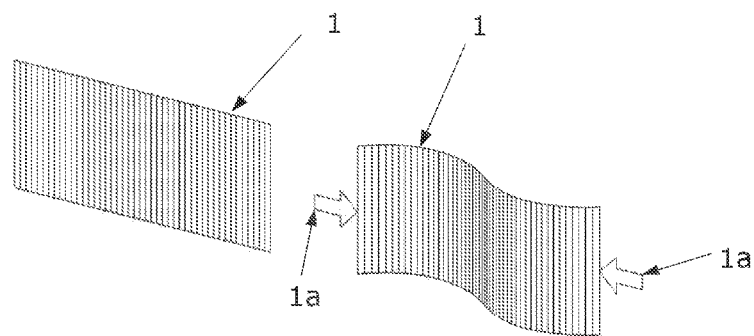
FIG. 1 shows an example deformation of flexible sheet-like material in an embodiment of the RTP.
Figure 2:
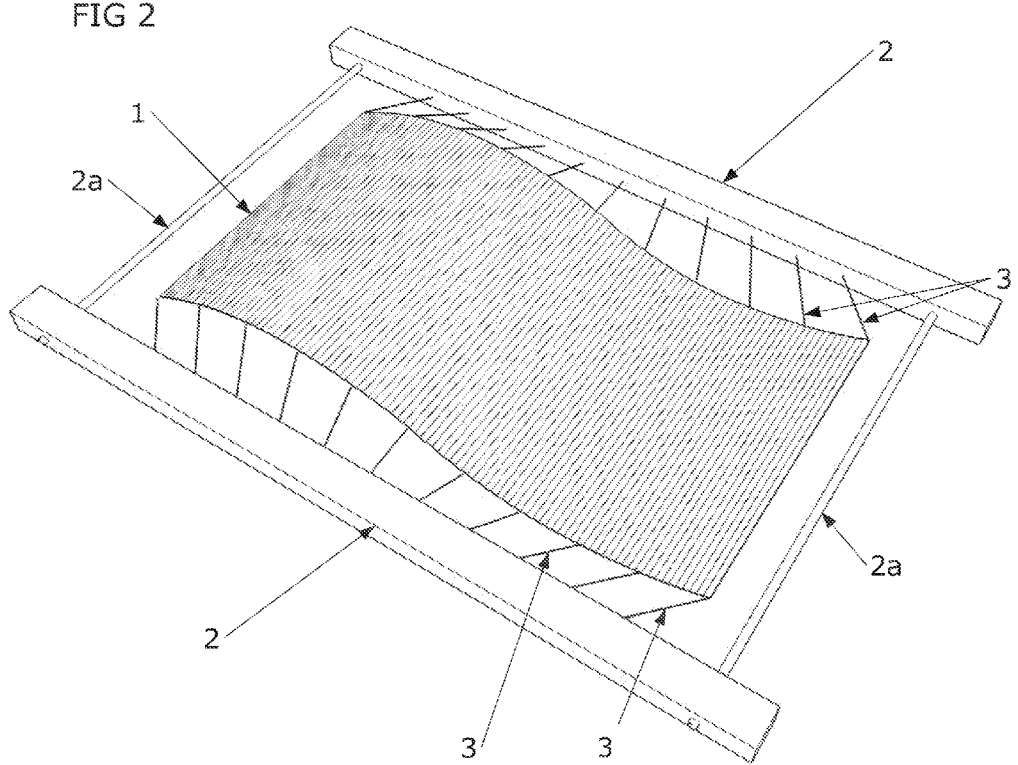
FIG. 2 shows a linear coupling embodiment of the RTP.
Figure 3:
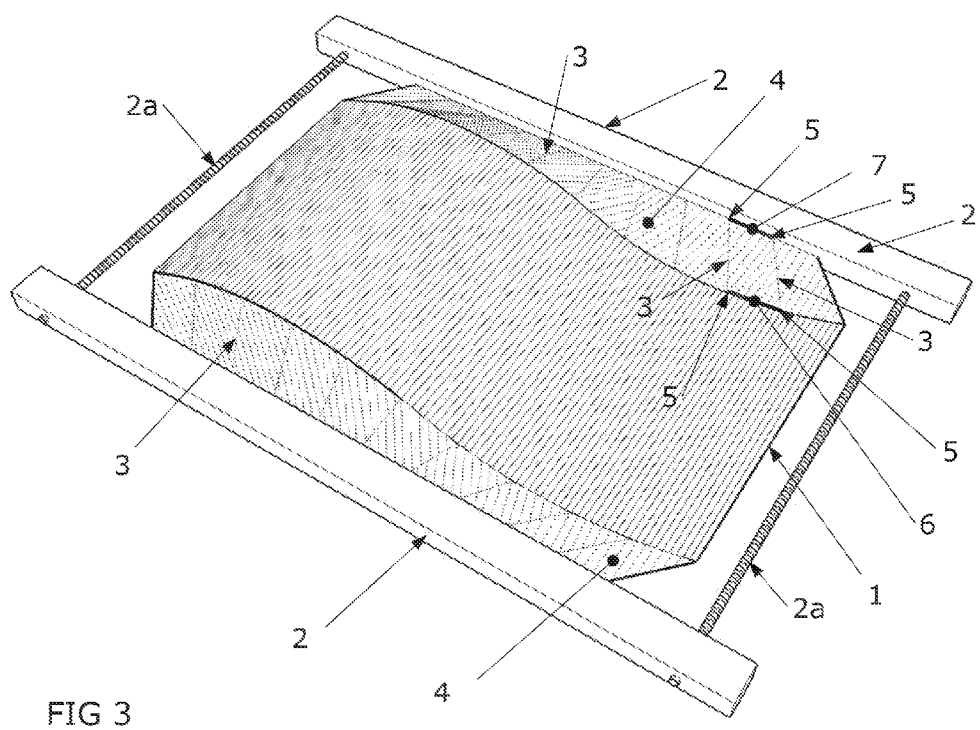
FIG. 3 shows a coupling membrane embodiment of the RTP.

In a transducer embodiment such as that shown in FIG. 1, a flexible sheet-like material 1 may be deformed during fabrication with an applied force 1a, and then fixed to two rigid or semi-rigid restraining elements 2 via three or more linear coupling elements 3 along each of two opposite edges of the flexible sheet-like material 1 as shown in one embodiment in FIG. 2. In some embodiments, the linear coupling element 3 may be comprised of string, thread, wire, chain and/or the like. In some embodiments, the linear coupling element may comprise an articulated member having little or no compressive strength so that the linear coupling element 3 made therefrom does not transfer forces between the sheet-like material 1 and the restraining element 2 except when in tension, or primarily in tension. In some embodiments, such as shown in one example in FIG. 3, one or more coupling membranes 4 may be used as well as, or instead of, linear coupling elements 3 being multiply or continuously fixed to the sheet-like material 1 and restraining element 2, where the coupling membrane 4 transfers only tensile forces, or primarily tensile forces, between the sheet-like material 1 and the restraining element 2. In some embodiments, the restraining elements 2 may be secured and/or fixed at a specific distance apart from each other and/or a specific distance from each edge of the sheet-like material 1, such as to support persistent deformations and/or oscillations of the sheet-like material of a specific amplitude and/or range of amplitudes. For example, in some embodiments, the restraining elements 2 may be fixed at a distance from each side edge of the sheet-like material 1, the distance ranging from zero to the full length of a linear coupling element 3.

In some embodiments, the distance from each side of the sheet-like material 1 and the restraining elements 2 may be defined by at least one secondary restraining element 2a. The secondary restraining element 2a may also serve the purpose of controlling strain on the linear coupling elements and controlling strain and deformation amplitude of the sheet-like material 1. For some transducer embodiments with linear coupling elements 3, the attachment points 5 of the linear coupling elements 3 to the sheet-like material 1 in its relaxed state may be a distance 6 from each other that is greater than the distance 7 between attachment points 5 of the linear coupling elements 3 to the restraining elements 2, as exhibited in one embodiment in FIG. 3. Attachments may be made be of any of a variety of a different types, including adhesives, fasteners, threading and/or weaving of coupling elements within the material of the sheet-like materials, and/or the like.

Figure 4A:
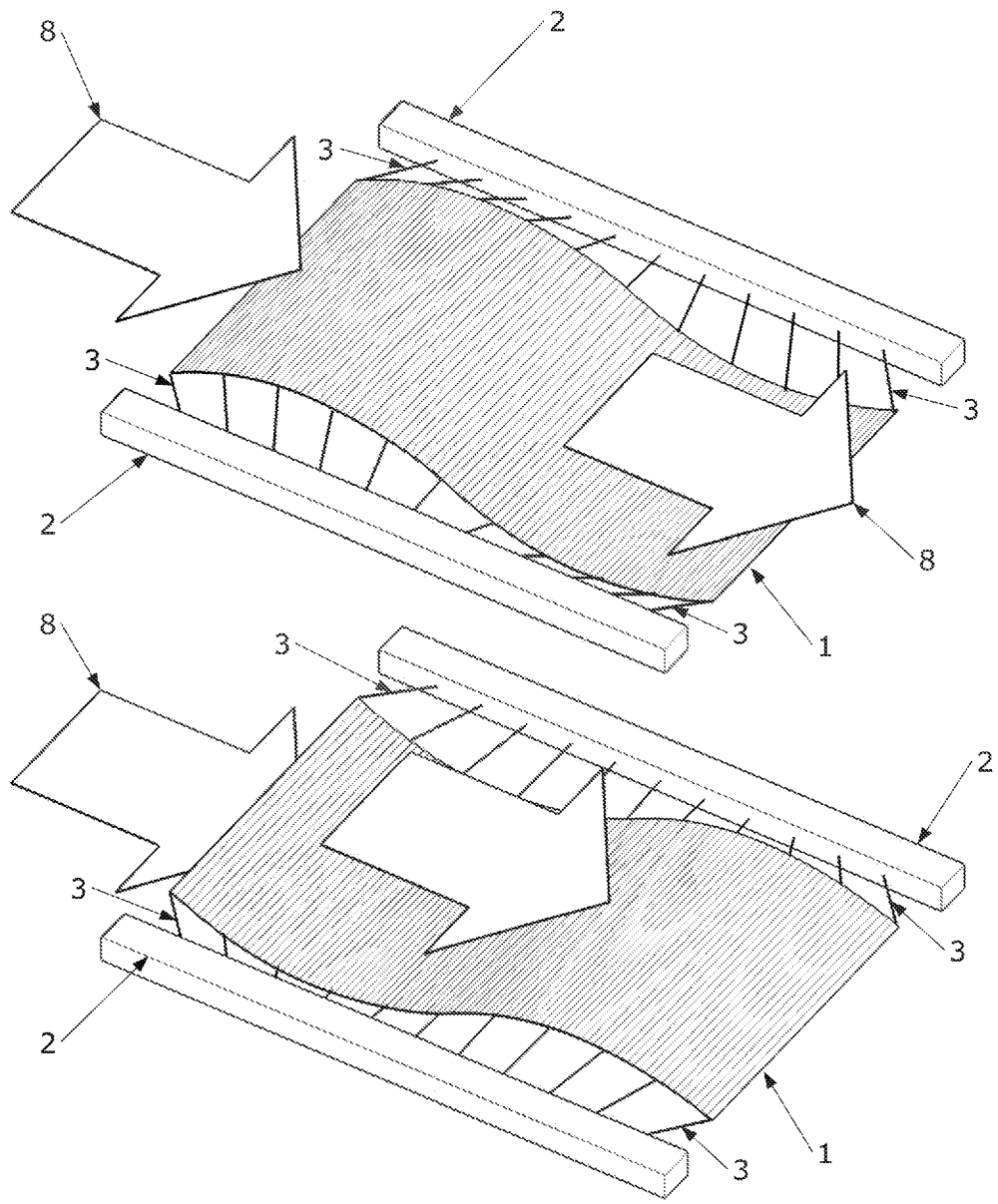
FIGS. 4A-4B show force acting on embodiments of the RTP.

When directional force 8 is applied to the embodiment with linear coupling elements 3, such as from but not limited to a fluid flow, the bulge-deformations in the sheet-like material 1 may move in the direction of the force until the phase of the deformations is reversed, and may continue thereafter, as shown in one example in FIG. 4A. In one embodiment, the process will be repeated so long as the directional force 8 is maintained. The mechanical action and its associated cycles of material strain in the sheet-like material 1 and/or in the linear coupling elements 3 may be used to create electrical energy, such as via electroactive polymers, piezoelectric materials, and/or the like materials exhibiting an electrical response to mechanical strain and/or vice versa. In some embodiments, the transducers may also be utilized as sensors, such as for measuring fluid speed.

Figure 4B:
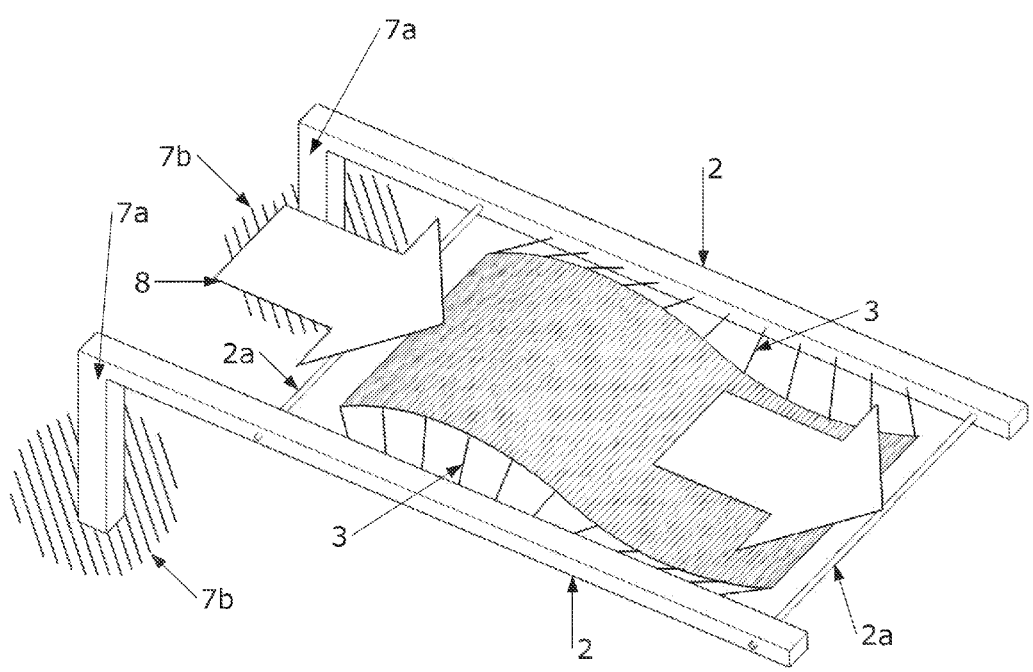

In some pump embodiments, the transducer may operate anchored in a fluid flow environment or otherwise substantially fixed relative to a flowing fluid. For example, the restraining elements 3 may be secured in position, such as by attaching them 7a to a fixed substrate, as illustrated in one implementation in FIG. 4B. In the example embodiment shown in FIG. 5, two flexible layers of sheet-like material 1 may be coupled via common linear coupling elements 3. In one implementation, the flexible sheet-like layers 1 may be coupled to linear coupling elements 3 via coupling element extensions 3a. In one implementation, in between the two flexible layers 1 may be an elastic tube 15 that is open to ambient fluid, such as water, at the upstream end and closed at the downstream end except for an opening into a tube or passage 3b that removes fluid pumped by the mechanism.

Figure 6:
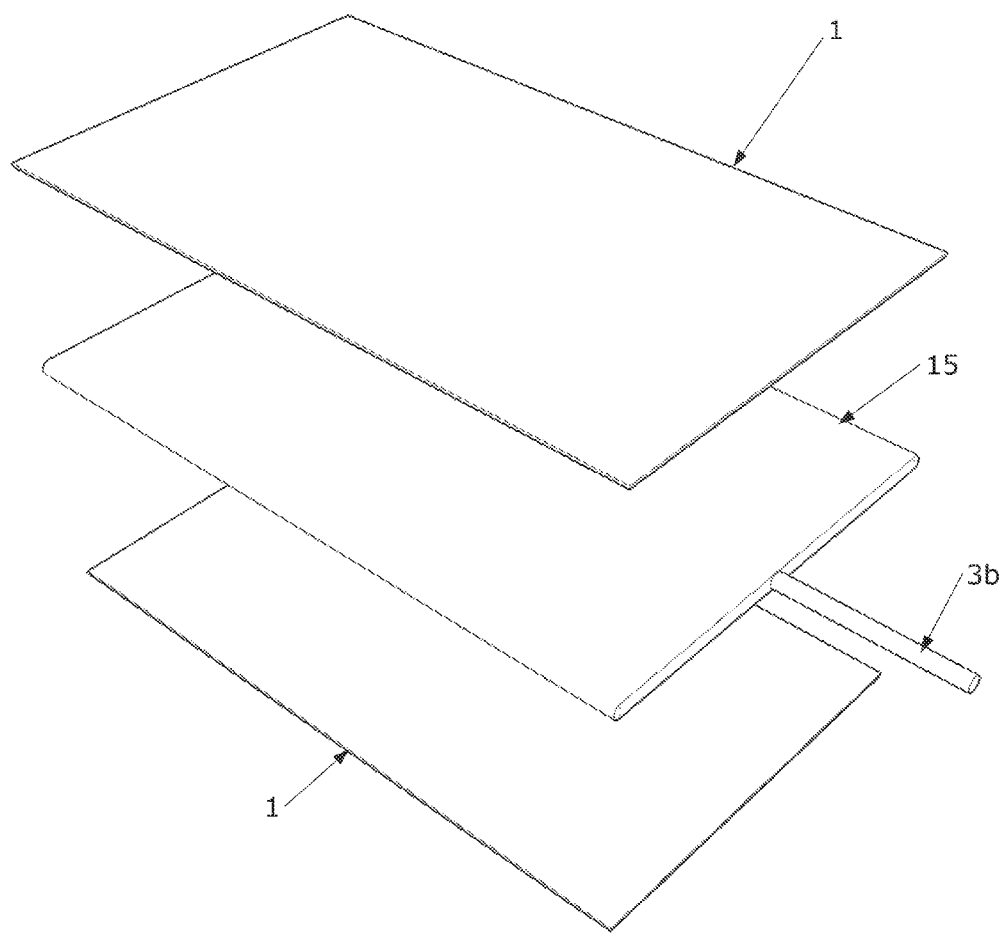
FIG. 6 shows an exploded view of a sample pump embodiment of the RTP.

FIG. 5 shows a cross-sectional view through the mechanism in one embodiment. Under operation, a small variable space between the two layers of sheet-like material 1 may allow fluid to enter at the upstream end of the elastic tube 15 when the position of this variable space occurs at the upstream end of the elastic tube 15, allowing fluid into the elastic tube 15. Under operation, the small space may be pushed in the direction of fluid flow. Fluid entering the elastic tube 15 at the upstream end may be pushed along between the two layers of sheet-like material 1 and may exit the system via a secondary tube 3b, as illustrated in one embodiment in FIG. 6, showing the layering arrangement in an exploded view of the sheet-like material 1, elastic tube 15, and secondary tube 3b at the downstream end of the elastic tube 15.

Figure 7:
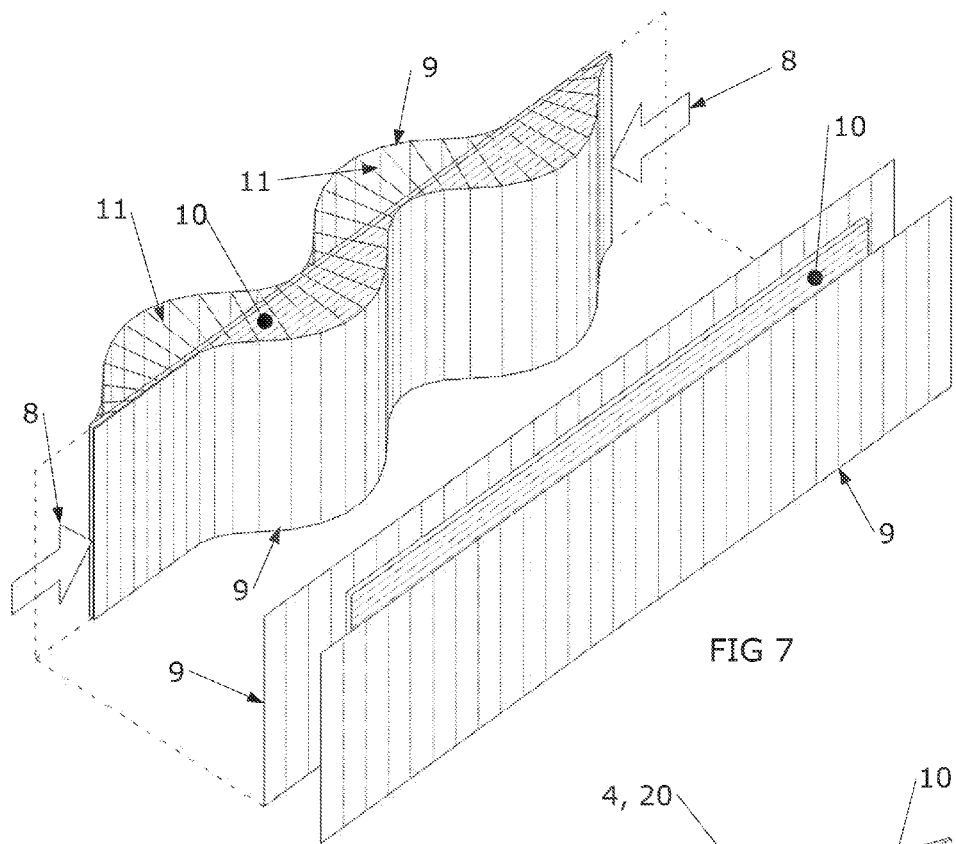
FIG. 7 shows an example restraining mechanism in an embodiment of the RTP.

In some embodiments, such as shown in one example in FIG. 7, force may be applied 8 to two flexible sheet-like elements 9 which may then each be fixed at two opposite ends to a central rigid restraining element 10 which may be shorter than the lengths of the two sheet-like flexible elements 9, maintaining the sheet-like elements 9 in a buckled state with deformations.

Figure 8:
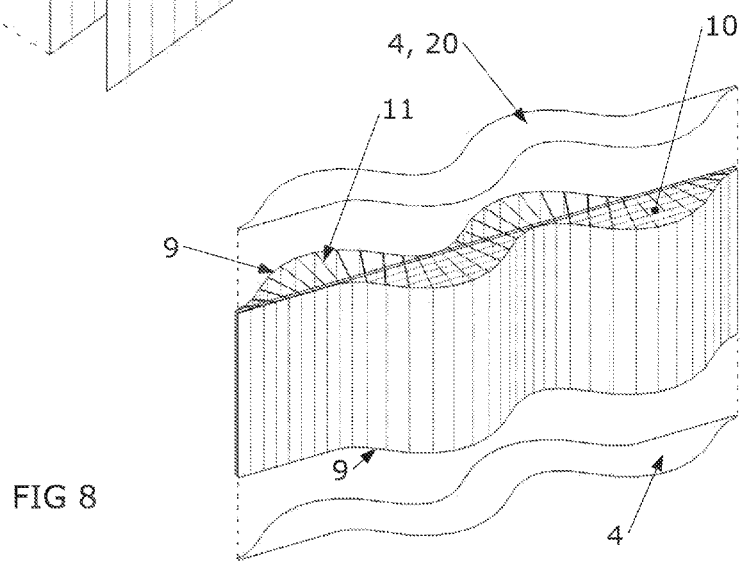
FIG. 8 shows an example connection mechanism in an embodiment of the RTP.

In an embodiment, two opposite edges of each sheet-like element 9 are connected to each other via linear coupling elements 11 or by a coupling membrane 4, or by both linear coupling elements 11 and coupling membranes 4, 20, as shown in one example in FIG. 8. The lengths of the linear coupling elements 11 may be set and/or selected to limit the amplitudes of the deformation buckles in the sheet-like elements 9. The distances between the inner surfaces of the two sheet-like elements 9 may be fixed relative to each other due to restraint by the linear coupling elements 11. In one embodiment, the distances between the inner surface of the sheet-like elements 9 and the central rigid restraining element 10 varies between zero and the length of the closest linear coupling element 11.

Figure 9:
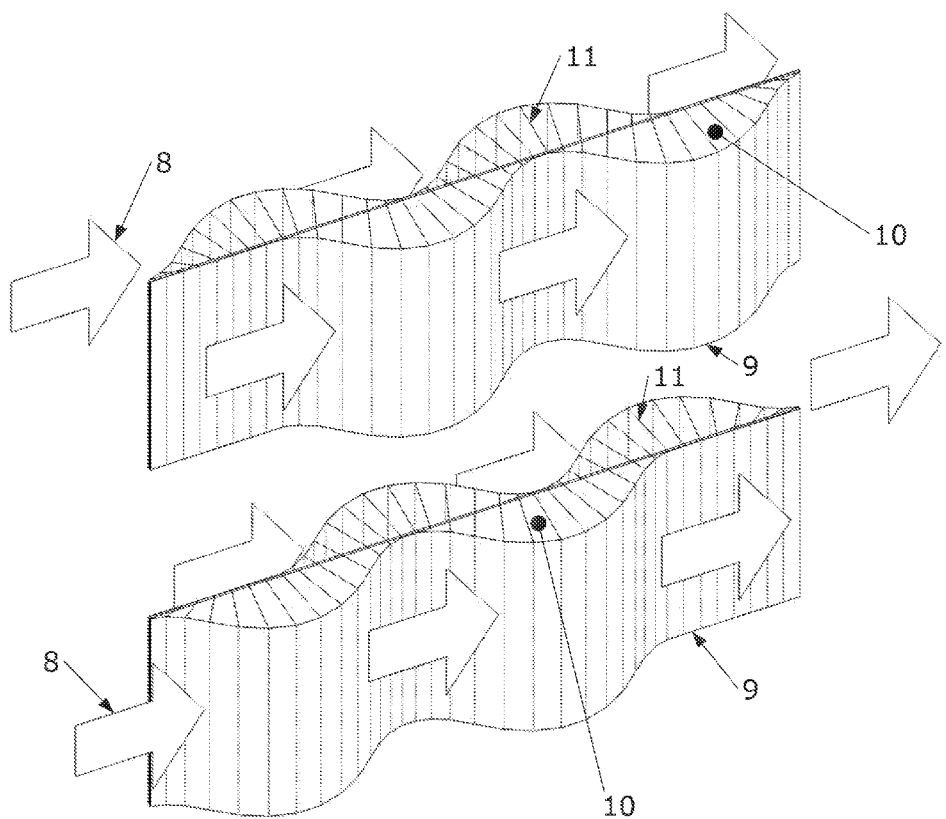
FIG. 9 shows force acting on an embodiment of the RTP.

When directional force 8 is applied to the transducer embodiment described above, such as from but not limited to a fluid flow, the buckled, bulge-deformations in the sheet-like elements 9 may move in the direction of the force until the phase of the deformations is reversed, and may continue thereafter, as shown in one embodiment in FIG. 9. In one embodiment, the process may be repeated so long as the directional force is maintained.

In some embodiments, the transducers described above may convert the kinetic energy of moving fluid into mechanical action able to perform useful work, such as pumping. The mechanical action and its associated cycles of material strain in the sheet-like material 1, 9 and/or in the linear coupling elements 3, 11, may be used to create electrical energy via electroactive polymers, piezoelectric materials, and/or other materials exhibiting an electrical response to mechanical strain and/or vice versa. In some embodiments, the transducers may also be utilized as sensors such as for measuring fluid speed.

Figure 11:
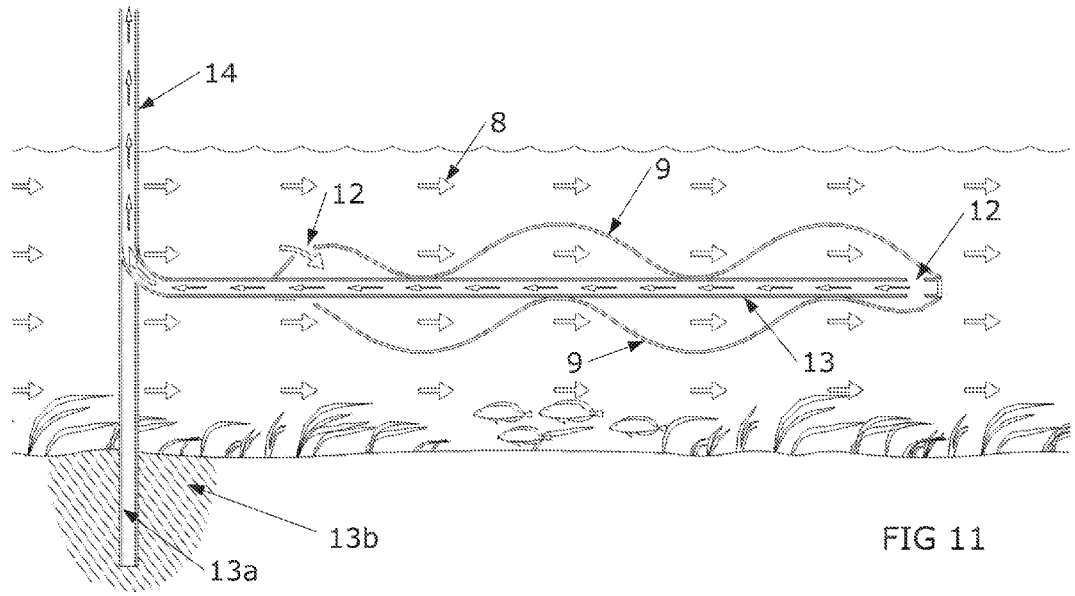
FIG. 11 shows an example anchoring mechanism in an embodiment of the RTP.
Figure 12:
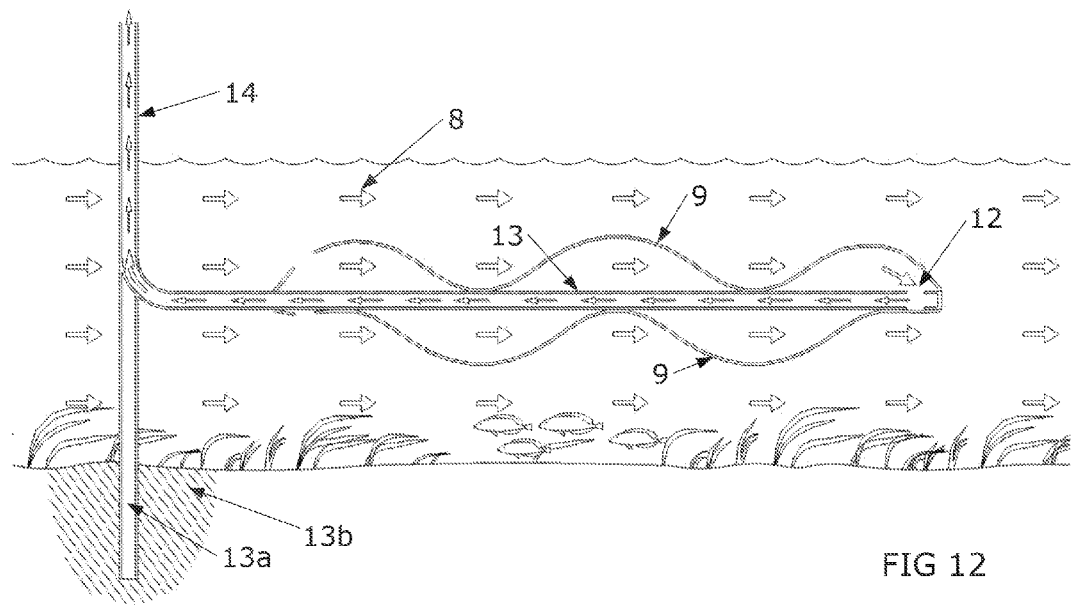
FIG. 12 shows an example conduit in an embodiment of the RTP.
Figure 13:
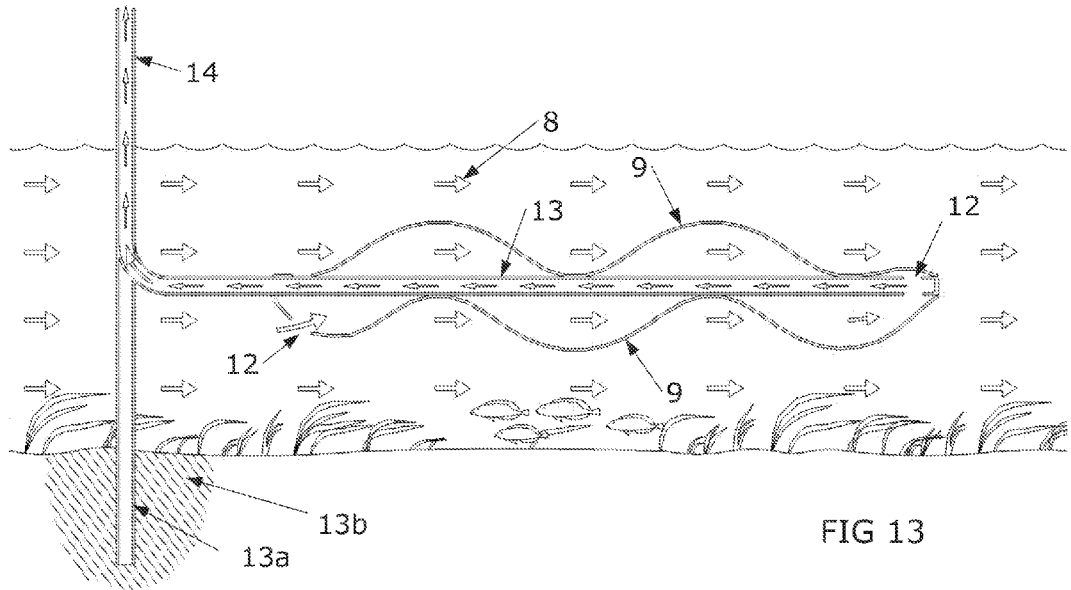
FIG. 13 shows an example anchoring mechanism in an embodiment of the RTP.
Figure 14:
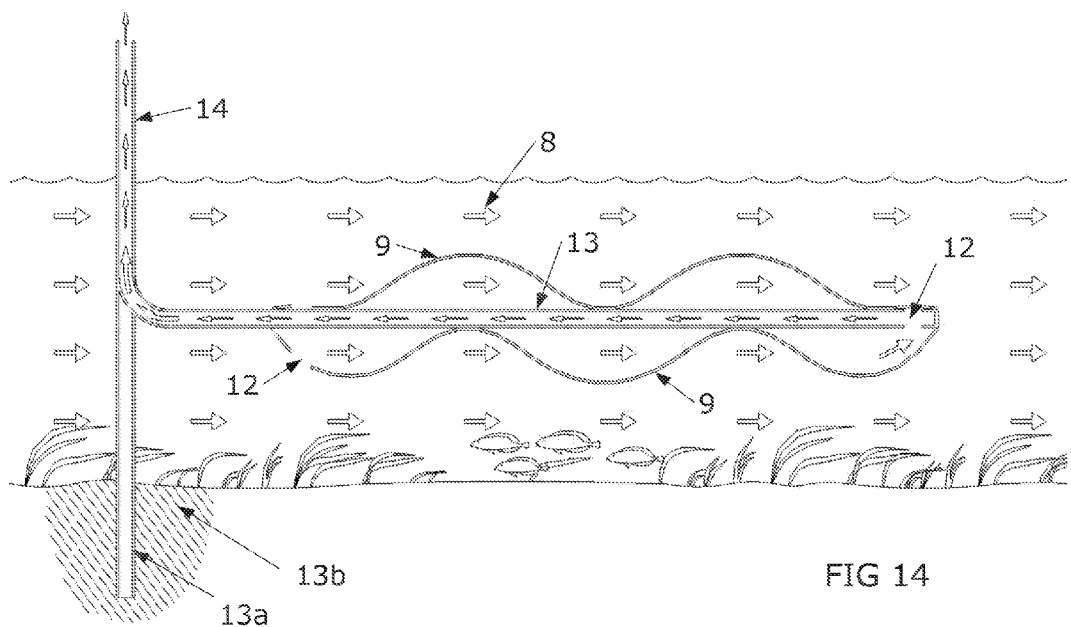
FIG. 14 shows an example conduit in an embodiment of the RTP.

Some pump embodiments of the transducer described above may operate anchored in a fluid flow environment and/or otherwise fixed and/or secured relative to flowing fluid. As shown in FIG. 10A, in some embodiments the central rigid restraining element 10 may be a hollow conduit 13. In some embodiments, the sides of the pumping mechanism may be enclosed by flexible membranes 20 and/or coupling membranes 4, as illustrated in one example in FIG. 10B. In one embodiment, the rigid restraining element 10 may be secured, such as via a post or anchoring system 13a, to an immovable substrate 13b such as a stream bed, as illustrated in one example in FIG. 11. An opening 12 at the upstream end of each sheet-like element 9 may allow fluid, such as ambient fluid or other special-purpose fluid, in between the sheet-like element 9 and the hollow conduit 13 when the cycle of deformation movement is such that a bulge forms at the upstream end of the sheet-like element 9, as illustrated in FIG. 11 and FIG. 12. Fluid that has entered the space formed by the bulge may be carried by the bulge in the direction of fluid flow as the bulge deformation travels along the mechanism. There may be an opening 12a at the downstream-end of the hollow conduit 13. When fluid carried along in a bulge cavity reaches the downstream-end of the hollow conduit 13 the fluid may be pushed inside the hollow conduit 13, such as shown in the examples of FIGS. 11-14. In some embodiments, fluid may be extracted from the hollow conduit 13 via a tube or another conduit or chamber 14.

Figure 15:
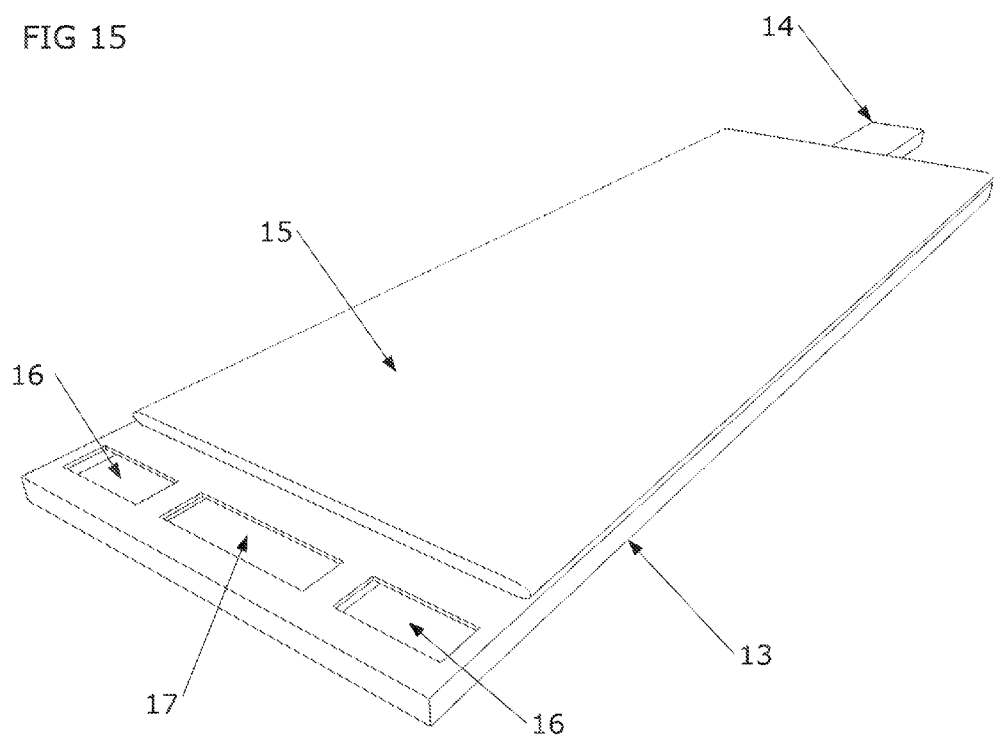
FIG. 15 shows another example pump embodiment of the RTP.
Figure 16:
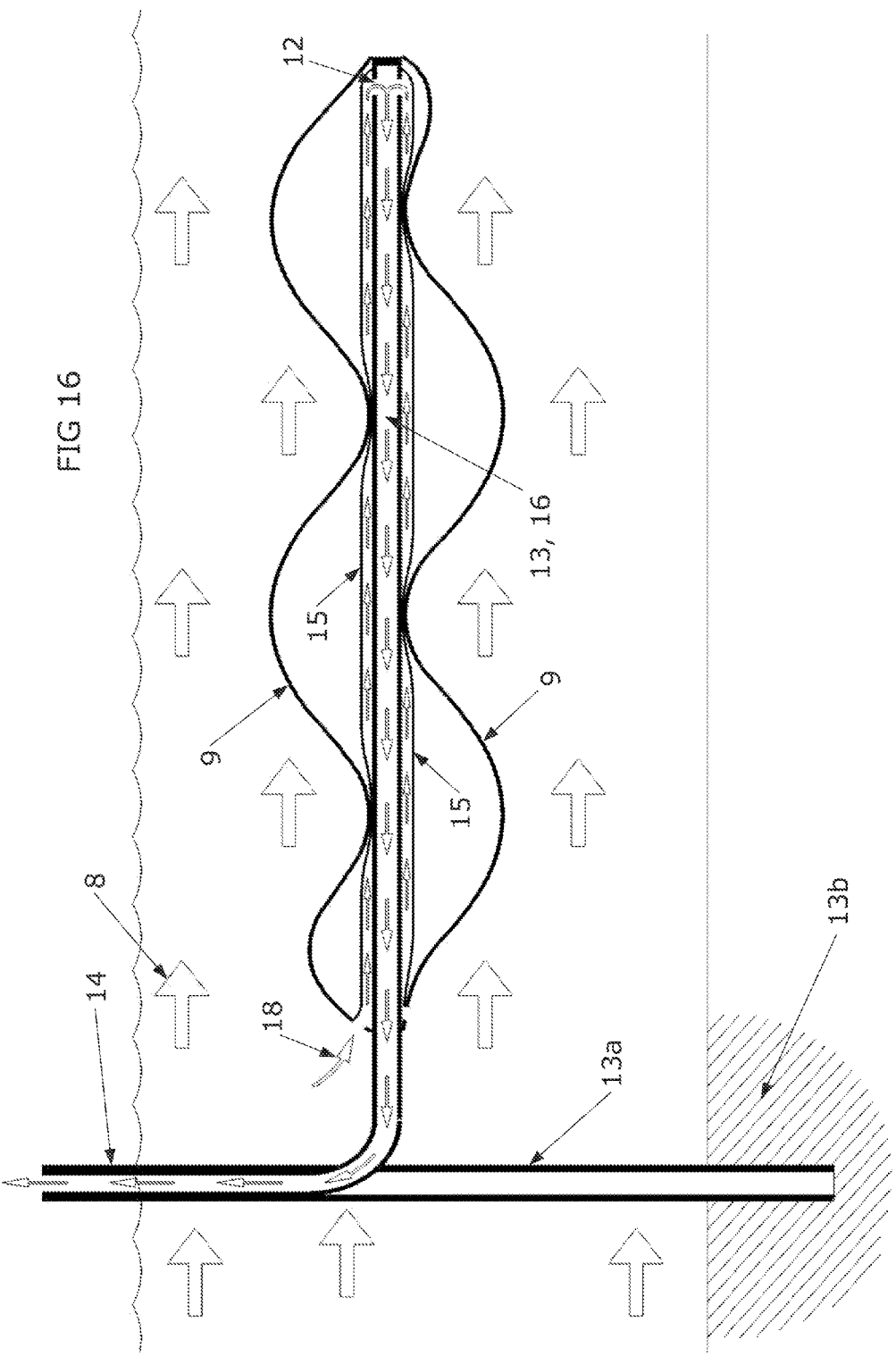
FIG. 16 shows an example implementation of a pump embodiment of the RTP.
Figure 17:
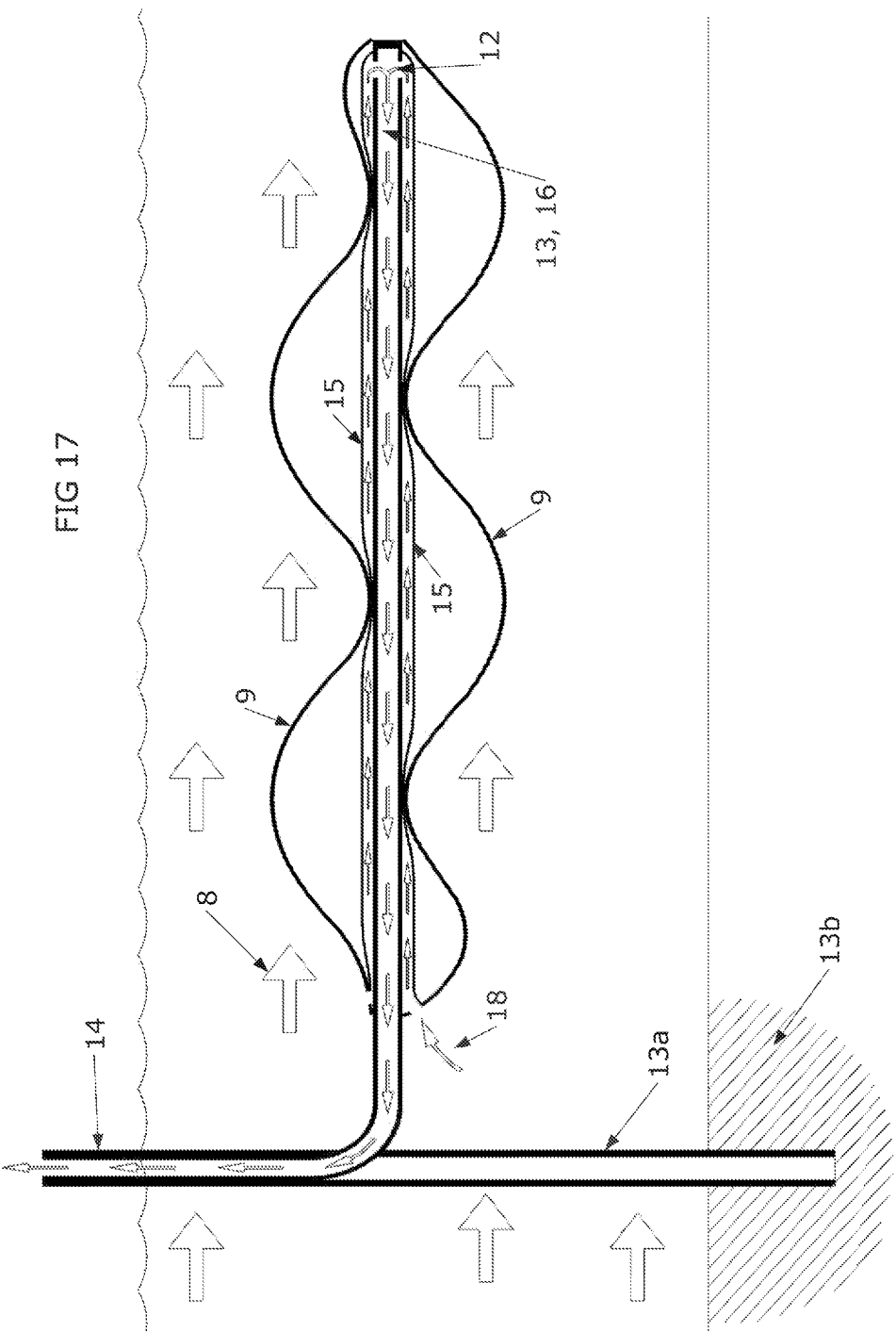
FIG. 17 shows an example implementation of a pump embodiment of the RTP.

In some pump embodiments of the transducer, such as illustrated in one example in FIG. 15, fluid 18 entering the openings 12 at the upstream ends of the sheet-like elements 9 may enter elastic tubes 15 situated between each sheet-like element 9 and the hollow conduit 13. In one embodiment, fluid may enter the elastic tubes 15 at the upstream end and may be pushed along in the downstream direction where it empties into at least one secondary chamber 16 within the hollow conduit 13, such as illustrated in the examples shown in FIG. 16 and FIG. 17.

Figure 18:
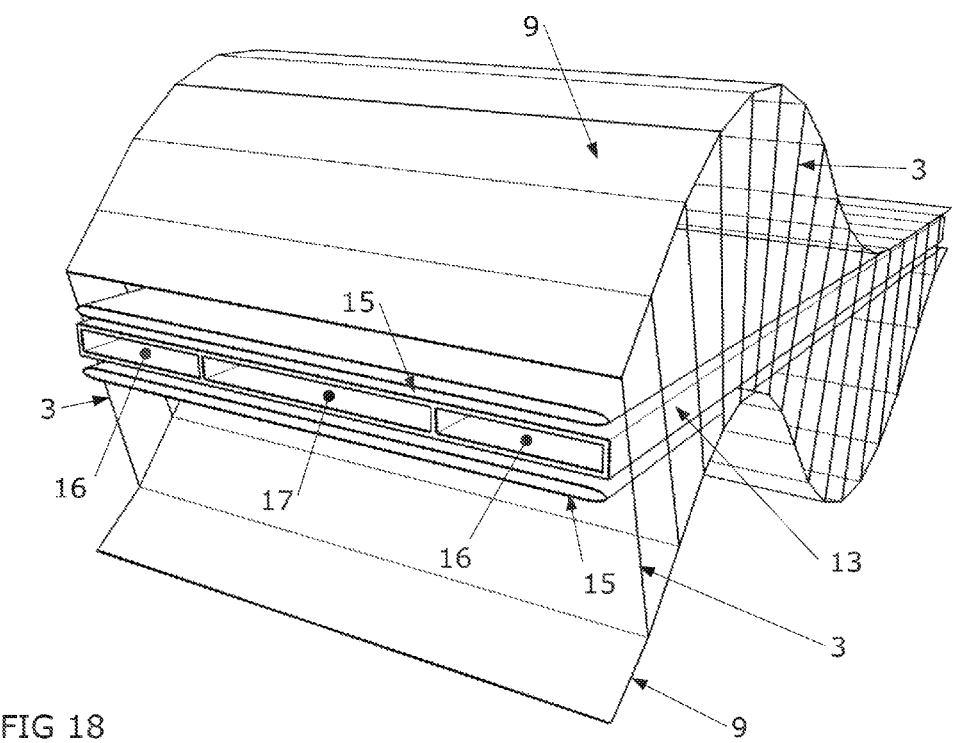
FIG. 18 shows a cross-section of a pump embodiment of the RTP.

The varying volumes of space between the elastic tubes 15 and the sheet-like elements 9 may, in one implementation, be occupied by air or other secondary fluid which may be cycled through the system via at least one tertiary chamber 17 within the hollow conduit 13, as illustrated in one example in FIG. 15. The tertiary chamber 17 may be open to the variable volumes of space between the sheet-like elements 9 and the hollow conduit 13 at the upstream and downstream ends of the hollow conduit 13. FIG. 18 shows, in one embodiment, a cross-section through such a pump embodiment, with the elastic membranes 20 at the sides removed for visual clarity.

Figure 19A:
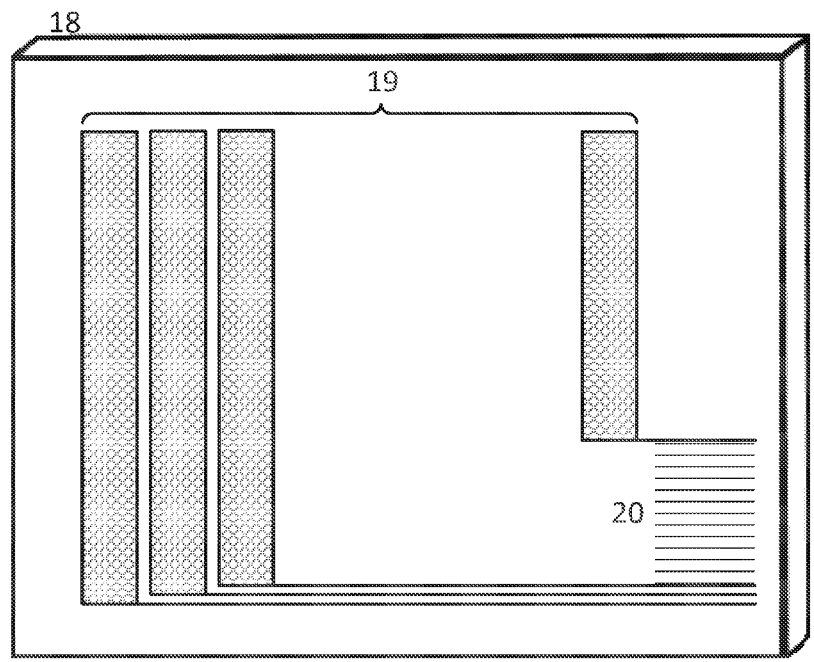
FIGS. 19A-19B show aspects of an implementation of ribbon electrode circuitry for power generation in one embodiment of the RTP.
Figure 19B:
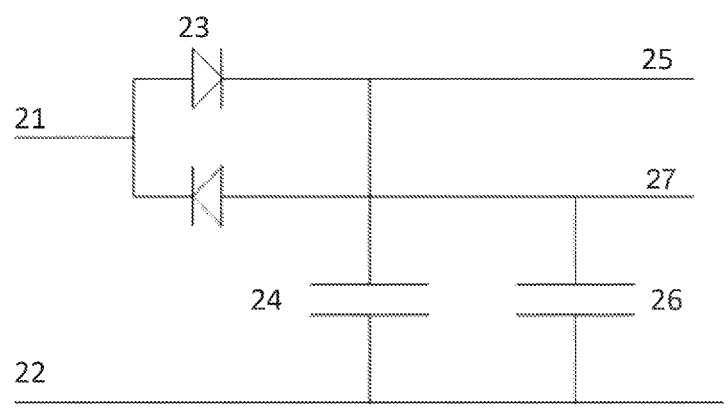

As noted above, aspects of the embodiments described herein may be adapted for power generation, sensor operation, and/or the like such as by the use of electroactive materials exhibiting an electrical response to mechanical strain, such as electroactive polymers, piezoelectric films, and/or the like. Such materials may be incorporated into components of the ribbon transducers described above, such as but not limited to the flexible sheet-like members 1 and manipulated for actuation thereof and/or monitored to detect and measure mechanical strains. FIG. 19A illustrates a piezoelectric film 18 configured for incorporation into the disclosed ribbon transducers as a power extraction component to couple to the dynamic undulations of the flexible sheet-like member 1 caused by a flowing fluid to extract power therefrom. The film 18 may include one or more top-layer electrodes 19, which are electrically coupled to bottom-layer electrodes which may be configured as a solid conductive layer, a projection of the top-layer electrode configuration, and/or the like. The film 18 may further comprise a connector pattern 20 configured to facilitate removal of accumulated charge from the piezoelectric film to power extraction and/or sensor circuitry. FIG. 19B shows aspects of an implementation of power extraction circuitry in one embodiment. The illustrated example includes a connection to a top-film electrode segment 21 and a connection to a bottom-film electrode segment 22. The circuit may further include positive and negative charge-collection diodes 23, configured to admit current associated with positive and negative bias of film electrodes 18 caused by varying oscillations of the flexible sheet-like member 1. The circuit may further include at least one positive charge collection capacitor 24 and circuit node 25, as well as at least one negative charge collection capacitor 26 and circuit node 27.

In order to address various issues and advance the art, the entirety of this application for RIBBON TRANSDUCER AND PUMP APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. In addition, the disclosure includes other inventions not presently claimed. Applicant reserves all rights in those presently unclaimed inventions including the right to claim such inventions, file additional applications, continuations, continuations in part, divisions, and/or the like thereof As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of an RTP individual and/or enterprise user, mechanism configuration, deployment environment, and/or the like, various embodiments of the RTP may be implemented that enable a great deal of flexibility and customization. For example, aspects of the RTP may be adapted for propulsion, water filtering, vacuuming, fluid circulation and/or redistribution, and/or the like. While various embodiments and discussions of the RTP have been directed to energy generation and mechanical pumping, however, it is to be understood that the embodiments described herein may be readily configured and/or customized for a wide variety of other applications and/or implementations.

What is claimed is:

1. An apparatus, comprising:
   first and second flexible sheet-like members, each having respective left and right side edges, having respective front and back edges, having respective longitudinal axes oriented substantially parallel to each other and having respective inner and outer contact surfaces oriented substantially parallel to each other,
      wherein the longitudinal axes are oriented substantially parallel to a primary flow direction of a flowing first fluid, with the front and back edges respectively disposed upstream and downstream of the flowing first fluid,
      wherein the outer contact surfaces project transverse to the longitudinal axes and are disposed in contact with the flowing first fluid, and
      wherein the inner contact surfaces and flexible membranes attaching respective left and right side edges of the first and second flexible sheet-like members define a fluid passage containing a second fluid;

a plurality of coupling members connecting respective left and right side edges of the first and second flexible sheet-like members;

a central rigid restraining element having front and back restraining element edges respectively disposed upstream and downstream of the flowing first fluid, wherein the unassembled length between the front and back restraining element edges is less than the unassembled length between the front and back edges of the first and second flexible sheet-like members, wherein the front and back edges of the first and second flexible sheet-like members are attached respectively to the front and back restraining element edges; and wherein dynamic undulations of the first and second flexible sheet-like members caused by the flowing first fluid impart forces via the inner contact surfaces to the second fluid to transport the second fluid in a direction substantially parallel to the longitudinal axes of the first and second flexible sheet-like members.

2. The apparatus of claim 1, wherein the coupling members comprise linear coupling members.

3. The apparatus of claim 1, wherein the coupling members comprise coupling membranes.

4. The apparatus of claim 1, wherein the coupling members comprise both linear coupling members and coupling membranes.

5. The apparatus of claim 1, wherein each flexible sheet-like member comprises an opening at the outer contact surface proximate to the front edge.

6. The apparatus of claim 5, wherein the opening admits the flowing first fluid into the fluid passage.

7. The apparatus of claim 5, wherein the central rigid restraining element comprises a hollow conduit having a conduit opening proximate to the back restraining element edge, the conduit opening admitting fluid from the fluid passage to the hollow conduit; and wherein the second fluid transported in the direction substantially parallel to the longitudinal axes of the first and second flexible sheet-like members enters the hollow conduit via the conduit opening and is transported within the hollow conduit in a direction substantially anti-parallel to the longitudinal axes.

8. The apparatus of claim 7, further comprising:

a hollow tube connected to the front edge of the central rigid restraining element and admitting fluid from the hollow conduit.

9. The apparatus of claim 7, further comprising:

an anchoring member connected to the central rigid restraining element and secured in relation to the flowing first fluid.

10. The apparatus of claim 9, wherein the hollow tube is affixed to the anchoring member to allow transport of the second fluid along a longitudinal anchor axis of the anchoring member.

11. The apparatus of claim 7, further comprising:

an anchoring post connected to the central rigid restraining element and secured in relation to the flowing first fluid.

12. The apparatus of claim 1, wherein the linear coupling elements comprise electroactive polymers.

13. The apparatus of claim 1, wherein the first and second flexible sheet-like articles comprise electroactive polymers.

14. An apparatus, comprising:

first and second flexible sheet-like members, each having respective left and right side edges, having respective front and back edges, having respective longitudinal axes oriented substantially parallel to each other and having respective inner and outer contact surfaces oriented substantially parallel to each other, wherein the longitudinal axes are oriented substantially parallel to a primary flow direction of a flowing first fluid, with the front and back edges respectively disposed upstream and downstream of the flowing first fluid, wherein the outer contact surfaces project transverse to the longitudinal axes and are disposed in contact with the flowing first fluid, and wherein the inner contact surfaces define a fluid passage containing a second fluid;

a plurality of linear coupling elements connecting respective left and right side edges of the first and second flexible sheet-like members;

a central rigid restraining element having front and back restraining element edges respectively disposed upstream and downstream of the flowing first fluid, wherein the distance between the front and back restraining element edges is less than the distance between the front and back edges of the first and second flexible sheet-like members, wherein the front and back edges of the first and second flexible sheet-like members are attached respectively to the front and back restraining element edges, and wherein the central rigid restraining element comprises a hollow conduit;

first and second elastic tubes, the first elastic tube situated between the inner contact surface of the first flexible sheet-like member and the central rigid restraining element, and the second elastic tube situated between the inner contact surface of the second flexible sheet-like member and the central rigid restraining element, wherein the first and second elastic tubes include upstream openings at upstream ends, the upstream openings admitting the first flowing fluid into interior regions of the first and second elastic tubes, and downstream openings at downstream ends, the downstream openings admitting the first flowing fluid from the interior regions of the first and second elastic tubes to the hollow conduit; and wherein dynamic undulations of the first and second flexible sheet-like members caused by the flowing first fluid impart first forces via the inner contact surfaces to the second fluid which impart second forces to walls of the first and second elastic tubes to transport the first fluid therein in a direction substantially parallel to the direction of the flowing first fluid.

15. The apparatus of claim 14, wherein the first fluid transported in the direction substantially parallel to the direction of the flowing first fluid enters the hollow conduit via the downstream, opening and is transported within the hollow conduit in a direction substantially anti-parallel to the direction of the flowing first fluid.

* * * * *